Figures 1, 2:
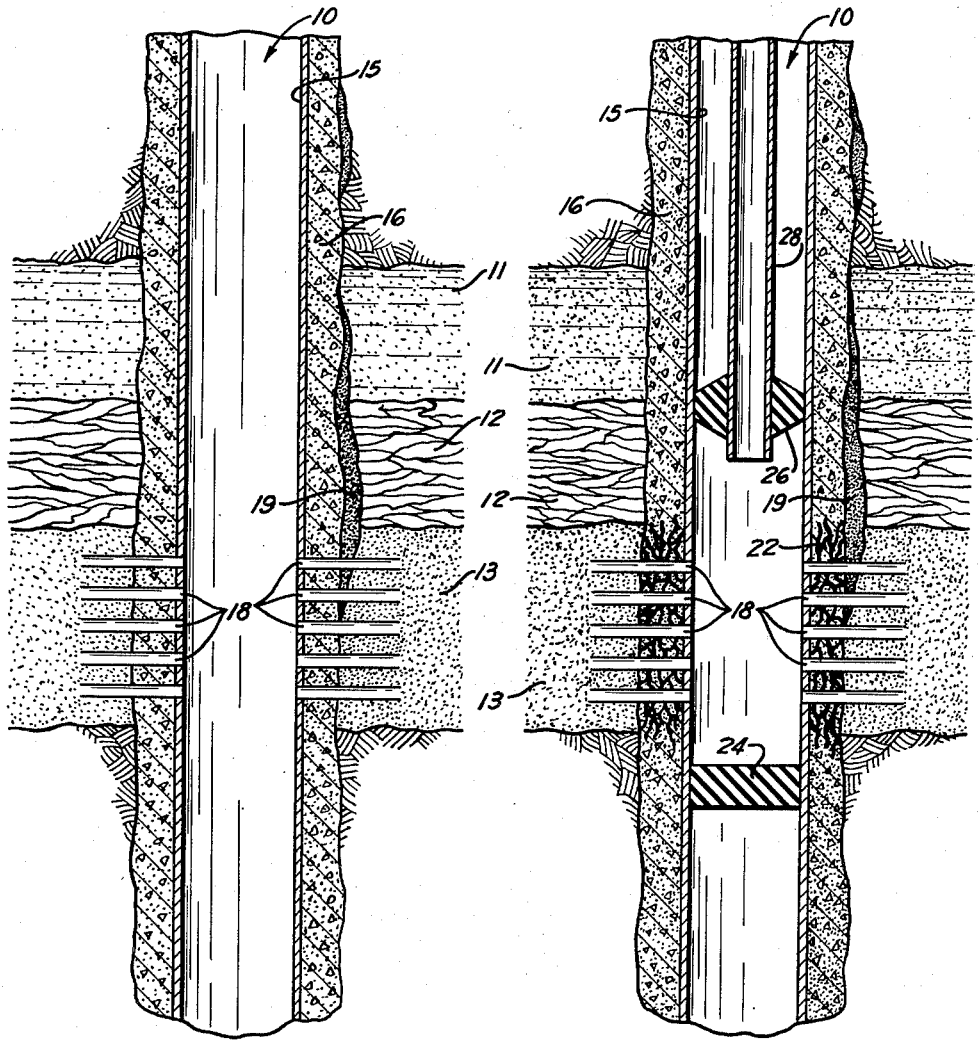

INVENTOR.
ABRAHAM J. TEPLITZ
BY
HIS ATTORNEY

United States Patent Office 2,813,584
Patented Nov. 19, 1957

2,813,584

SQUEEZE CEMENTING

Abraham J. Teplitz, Penn Township, Allegheny County, Pa., assignor to Gulf Research & Development Company, Pittsburgh, Pa., a corporation of Delaware Application June 20, 1955, Serial No. 516,379

7 Claims. (Cl. 166—23)

This invention relates to a method for shutting off water or other undesirable fluids from producing zones of oil or gas wells and more particularly to an improvement in squeeze cementing.

After drilling a well it is customary to insert tubular casing in the well to support the walls of the hole and to isolate the productive formation from other formations containing fluids. The fluid to be excluded is usually water, although it may be gas or even another crude oil.

To obtain such isolation, the annular space between the casing and the walls of the hole is filled with a sheath of cement. This is done by pumping a neat slurry of Portland cement down the casing and upwardly on the outside of the casing into the annular space. If it has been properly placed, the cement, when it hardens, anchors the casing in place and forms a barrier to the vertical migration of fluids in the annulus. Perforations are then made through the casing and the cement opposite the producing zone. These perforations allow the fluids from the producing horizon to enter the casing and flow or be pumped to the surface.

If the annular cement sheath is discontinuous or contains imperfections, as is often so in conventional cementing operations, there will be channels which allows communication between the producing formation and a formation containing undesired fluids. If water flows to the producing formation through such channels, a number of problems can result. The water may impair the productivity of the producing horizon or may stop production entirely. The water and oil may form emulsions which are difficult or costly to separate. Furthermore, the produced water usually causes serious corrosion troubles. In pumping wells the production of water also increases the lifting cost of the oil.

In some oil-bearing formations the oil section is sandwiched between a gas zone above and a water zone below. An effort is made to place the perforations so as to enter only the oil layer. However, if, through inadvertence or inability to define the oil layer precisely, perforations are extended to either the water or gas zones, problems result. The troubles resulting from water production have already been described. In production from the gas zone, the problem is that the free escape of gas reduces the energy available for lifting the oil to the surface and reduces the recovery of oil from the reservoir. For this reason the regulatory bodies of oil-producing states impose penalties on production from wells having high gas-oil ratios. Abnormal gas production may result not only from lack of precision in perforation but also from the presence of vertical channels in the cement sheath as explained. Still another possible cause of abnormal gas production or of water production is vertical permeability within the formation from which the oil is being produced.

When the problems arise that I have described, squeeze cementing is commonly resorted to. Essentially, squeeze cementing is the forcing of cement slurry into the perforations or into the perforations and the channels in the cement surrounding the formation. A tubing string, usually provided with a cement retainer, is run into the well and set above the perforations. Then a fairly large amount of cement slurry is forced into the tubing and out through the perforations under pressure, usually until a predetermined high pressure is attained. The tubing is withdrawn and after the cement has set and hardened, the cement inside the casing is drilled out and the casing is reperforated in the desired interval.

When the trouble is due to inaccurate placement of the original perforations the squeeze cementing will be successful if the cement sets up in the perforations which it is desired to close. When the trouble is due to communication between zones through vertical channels in the cement sheath the operation will be successful if the cement enters and sets up in the channels. However, if critically located perforations or channels happen to be temporarily plugged by a bridge of formation materials or other debris, as appears to happen quite frequently, the cement will not enter these perforations or channels and the squeeze job will be unsuccessful. It is then necessary to repeat the job, usually with higher pressures being required.

Sometimes, in applying the squeeze job in the conventional manner, production from the well is permanently lost. This occurs when, because of the high pressures involved, extensive vertical fractures are formed within the producing formation. Cement which enters these fractures sets and forms barriers which isolate the pay zone and which are so thick or at such a distance from the well bore, that none of the available perforating methods will penetrate them. The present invention affords a method of squeeze cementing which does not require excessively high pressures and which greatly improves the chances of making an effective shutoff in one squeeze operation with a relatively small amount of cement.

The method of my invention, in general, comprises shutting off the flow of undesired fluids in a well provided with a cemented well casing by applying a stress from within the casing to the surrounding cement sheath in the interval at which the shutoff is desired, whereby to fracture the cement, and forcing a slurry of cement through perforations in the well casing and into the fractures in the cement sheath.

A more detailed description of the method will be given by reference to the drawing, of which Figure 1 is a diagrammatic view of a section of a producing oil well having an overlying water formation and vertical channels which permit the flow of water into the producing zone, and Figure 2 is a diagrammatic view of the well during a phase of squeeze cementing in accordance with the invention.

Figure 1 shows, by way of example, conditions in an oil well for which squeeze cementing might be used. The well 10 is drilled through a series of formations including a water sand 11, a shale strata 12 and into an oil sand 13. A casing 15 is set in the well through all the intervals and is surrounded by a cement sheath 16 which fills the annular space between the casing and the wall of the hole. The string of casing is perforated in the oil producing interval and oil is produced through the perforations 18. Assuming that it is found that much water is entering the well and is being produced with the oil, it can be surmised from the electric log, which is made as a matter of course before the casing has been introduced, that the water is coming from the nearby water-bearing interval above the oil sand. Squeeze cementing can then be used to shut off the water which flows downwardly through vertical channel 19 in the cement sheath 16.

In accordance with my novel method of squeeze cementing, the cement sheath surrounding the casing in the perforated interval is fractured. The cement is fractured by applying a stress to the sheath from within the casing. The sheath is thus strained and a network of cracks is produced in the cement. The stress can be applied in a number of different ways in accordance with the invention. My patent applications, Serial Number 424,862, filed April 22, 1954, and Serial Number 501,063, filed April 13, 1955, describe several methods for fracturing the cement sheath surrounding the casing in the producing zone of an oil well as a technique for completing wells. The described methods for fracturing the cement by applying a fracturing shock or stress to the cement sheath from within the casing can also be used in the method of my present invention for squeeze cementing.

After the cement has been fractured in the perforated interval by one of the suitable methods, the details of which will be discussed hereinafter, the appearance of the well will be as shown diagrammatically in Figure 2. The cement sheath 16 in the perforated interval has a network of fractures or cracks 22, a number of which connect the perforations 18 with the vertical channel 19, through which water can flow downwardly from formation 11. With the cement in this fractured condition, squeeze cementing is then carried out. As shown diagrammatically in Figure 2, a bridging plug 24 is set below the perforations. A cement retainer 26 is lowered with the tubing 28 and set above the perforations. A slurry of neat Portland cement is then pumped through the tubing and is forced outwardly through perforations 18 into the network of fractures 22 in the cement sheath. The hardened cement forms a barrier to the downward flow of water and the casing is then reperforated in the oil-bearing interval.

With a surface squeeze pressure usually less than 1500 pounds per square inch, e. g., 1000 to 1500 pounds per square inch or so, it is possible by my method to force cement into the fractures in the cement sheath and shut off the vertical channels 19. These relatively low pressures compare favorably with the surface pressures of about 3,000 to 6,000 pounds which often must be used to obtain a shutoff by conventional squeeze cementing through a perforated cement sheath which has not been fractured in the manner of my invention.

The description above refers to the use of a neat slurry of Portland cement in my improved squeeze cementing method. Any of the known compositions for squeeze cementing can be used in my method. Thus, the term "cement" as used herein includes any of the Portland cement or other hydraulic cement compositions or plastic compositions which are suitable for squeeze cementing operations in fluid producing wells.

By way of example, I have described the use of my improved method of squeeze cementing for shutting off the vertical migration of undesired fluids into a producing zone when the original cement job is defective. My method has other important uses for which conventional squeeze cementing has been used. For example, in the successive testing of zones in wells drilled and cased through several possible producing zones, the casing is perforated opposite a zone to test its productivity and, after testing, squeeze cementing is commonly used to close the perforations before another interval is tested. However, it is often difficult to get a complete shutoff by conventional squeeze cementing. A likely explanation for the difficulty is that some of the perforations are bridged or plugged by formation materials so that the cement does not enter them. These perforations are only weakly plugged and they become unplugged when the cement pressure is released. Fluids then enter the well and the squeeze cementing operation must be repeated. It may have to be repeated several times, usually resorting to very high pressures before a successful shutoff is obtained. The use of high pressures has an important disadvantage besides the obvious one of the expense of high pressure pumping. The very high pressures may cause a sudden breakthrough of the cement through the weak barriers to points far beyond the casing. As a result the cement sheath may extend into the formation to such a distance that it cannot be reperforated by gun perforators. Consequently, when a zone, after testing, has been shut off by high pressure squeeze cementing it may be difficult or impossible to make the zone produce again.

My novel method of squeeze cementing is adapted to avoid the problems of squeeze cementing of successive testing zones. When my method is used, the cement sheath is fractured and many channels for the cement slurry are formed. Consequently, considerably lower squeeze pressures can be used and the dangers of high pressure squeezing are avoided. My method of squeeze cementing reduces the possibility that weak plugs will prevent low pressure cement from entering the perforations because such plugs will themselves be fractured or weakened by the fracturing technique of my method. This is particularly true when an explosive charge is used for fracturing the cement.

My method of squeeze cementing also can be used in production zones which contain more than one fluid layer, for example, a formation in which the oil section is between a gas zone and a water zone. I have mentioned that in such a case it may be difficult because of inaccurate data to perforate the casing only opposite the oil layer and that either the water or gas zone may be unintentionally perforated. If so, my method of squeeze cementing can be used to shut off the perforations leading to the undesired fluids.

I have also mentioned that vertical permeability within a formation may be the cause for production of water or for abnormal gas production. In this situation it is desired to force cement out along the interfaces between the oil zone and the water or gas zones so as to form widely extending pancakes of cement that are barriers to the flow of gas or water into the perforations opposite the oil section. In conventional squeeze cementing it may be necessary to use very high pressures and large amounts of cement to form the desired pancakes of cement. My method of squeeze cementing creates many fractures in the cement sheath in the area of the perforations so that the cement slurry has numerous channels into the interfaces or zones of weakness between the oil zone and the gas or water zones. Therefore, my method makes it possible to seal off the oil zone with a low pressure and with a reasonably small amount of cement.

I have indicated above that the cement fracturing methods described in my mentioned patent applications can be used in my present method of squeeze cementing. In one of the preferred methods the cement is fractured by detonating an explosive within the casing. An explosive charge of the proper amount will bulge or deform the steel casing without rupturing it so that a stress will be applied to the surrounding sheath to cause fractures of the desired kind in the cement.

A particularly good explosive is the explosive cord known commercially as Primacord. This cord, ¼ inch in diameter, comprises an explosive cord of PETN (pentaerythritol tetranitrate) in a water-proofed textile wrapping. The cord explodes at a rate of about 20,000 feet per second. It is tough, flexible and insensitive to ordinary shock, friction, fire or temperatures encountered in oil wells. The cord is detonated by a blasting cap which can be actuated electrically from ground level. It can also be actuated by dropping a go-devil from ground level through the casing or by the use of a time clock, both in known manner. An explosive cord firing apparatus which can be used for fracturing the cement sheath in my squeeze cement method is described in the patent application of Theodore A. Kibby, Serial Number 439,401, filed June 25, 1954. While Primacord is a preferred explosive, other explosives or explosive cords with properties such as those described can be used.

The cement sheath can also be fractured by mechanically applying a deforming stress to the casing in the desired interval. The stress should be less than the elastic limit of the casing so that the casing will not be ruptured. A suitable apparatus that can be lowered in a well and used to apply outwardly directed deforming forces to a well casing is described in my patent application with Forest F. Versaw, Serial Number 445,842, filed July 26, 1954. The apparatus comprises a cylindrical member having plungers or pistons that extend radially from an interior hydraulic chamber. Hydraulic pressure is applied within the chamber and the pistons are forced outwardly against the inner wall of the well casing, thus expanding and deforming the casing. The cement sheath is strained when the casing is deformed and fractures of the desired type are produced.

The cement can also be fractured with a gun perforating device. However, the gun should be used so as to cause fracturing of the cement sheath rather than perforation. For example, the gun can be loaded with non-penetrating bullets such as soft-nosed lead bullets, or cylindrical unpointed steel bullets. Bullets of this kind when fired against the casing wall with a propellant charge which is not too great do not pierce the casing but strike against it with such a shock as to fracture the surrounding cement.

It is also possible in my squeeze cementing method to use a cement fracturing technique described in the patent application of Theodore A. Kibby, Serial Number 450,630, filed August 18, 1954. The gun is loaded with "shoulder" bullets. These bullets have a conical nose which has a base of smaller diameter than the cylindrical body of the bullet. An annular shoulder is formed where the nose joins the body of the bullet. When the bullet is fired with a properly selected small propellant charge, the conical point pierces a hole in the casing but the shoulder impedes further penetration. The bullet gives the casing a sharp physical shock which stresses and fractures the surrounding cement sheath. In this modification of my method, the perforating of the casing and the fracturing of the cement occur simultaneously. Usually the shoulder causes the bullet to rebound and leave a clean hole after piercing the casing but if bullets should remain in the casing a well scraper can be used to clear the perforations before beginning the cement squeeze.

I have said that the propellant charge is limited when bullets are fired into the casing wall in my method for fracturing the cement sheath without perforating it. The reason is that, even though the bullets have structures such as blunt noses or shoulders which reduce their ability to penetrate, if such a bullet is fired with a sufficient charge, the bullet may still penetrate. If it does, it will make an undesirably large hole in the casing and the sheath. Therefore, for fracturing the cement without penetrating it such bullets are fired with a propellant charge of about ¼ to ¾ the strength of the charge used for bullets of the same caliber when penetration of the cement and formation is intended.

Obviously many modifications and variations of the invention as hereinbefore set forth may be made without departing from the spirit and scope thereof and therefore only such limitations should be imposed as are indicated in the appended claims.

I claim:
1. A method of squeeze cementing through a cemented casing in a fluid producing well which comprises perforating the well casing and the surrounding cement sheath in the desired interval, thereafter fracturing the cement sheath and forming a network of cracks in said sheath throughout said interval by applying a stress to the cement sheath from within the casing in said interval and, thereafter, forcing a slurry of cement into said network of cracks in the cement sheath.

2. A method for shutting off the vertical migration of fluids adjacent a well provided with a cemented well casing which comprises perforating the casing in the interval at which the shut-off is desired, forming a network of cracks in the surrounding cement sheath throughout said interval by applying a stress to the cement sheath from within the casing, thereafter closing vertical channels in the cement sheath by forcing a slurry of cement through the perforations in the casing and into the network of cracks formed in the cement sheath and allowing the cement to set.

3. A method for successive testing of potential fluid-producing zones in a well which comprises perforating the well casing and the surrounding cement sheath opposite a potential producing formation, testing the productivity of the formation, thereafter and before testing another formation forming a network of cracks in the cement sheath in the tested interval by applying a stress to the surrounding cement sheath from within the casing, thereafter forcing a slurry of cement through the perforations in the casing and into the fractures in the cement sheath to close the perforation and shut off the tested formation and subsequently testing another formation.

4. A method of closing perforations in a well casing and a surrounding cement sheath which comprises forming a network of cracks in said cement sheath throughout the interval where perforations are to be closed by applying a fracturing stress to the cement sheath from within the casing in said interval, running a cement retainer on a string of tubing into the well and setting the retainer above the perforatons, pumping a cement slurry through the tubing at a surface pressure below about 1500 pounds per square inch, thus forcing a slurry of cement into the fractures in the cement sheath and into the perforations.

5. A method in accordance with claim 1 in which said stress is applied from within the casing by detonating an explosive charge.

6. A method in accordance with claim 1 in which said stress is applied from within the casing by applying outwardly directed deforming forces to the casing.

7. A method in accordance with claim 1 in which said stress is applied from within the casing by firing non-penetrating projectiles into the inner wall of said casing, the shock of said projectiles striking against the casing being sufficient to fracture the surrounding cement sheath and form passages for cement slurry in the cement.

References Cited in the file of this patent
UNITED STATES PATENTS

| | | |
|---|---|---|
| 2,033,562 | Wells | Mar. 10, 1936 |
| 2,718,264 | Allen et al. | Sept. 20, 1955 |